Patented Sept. 15, 1953

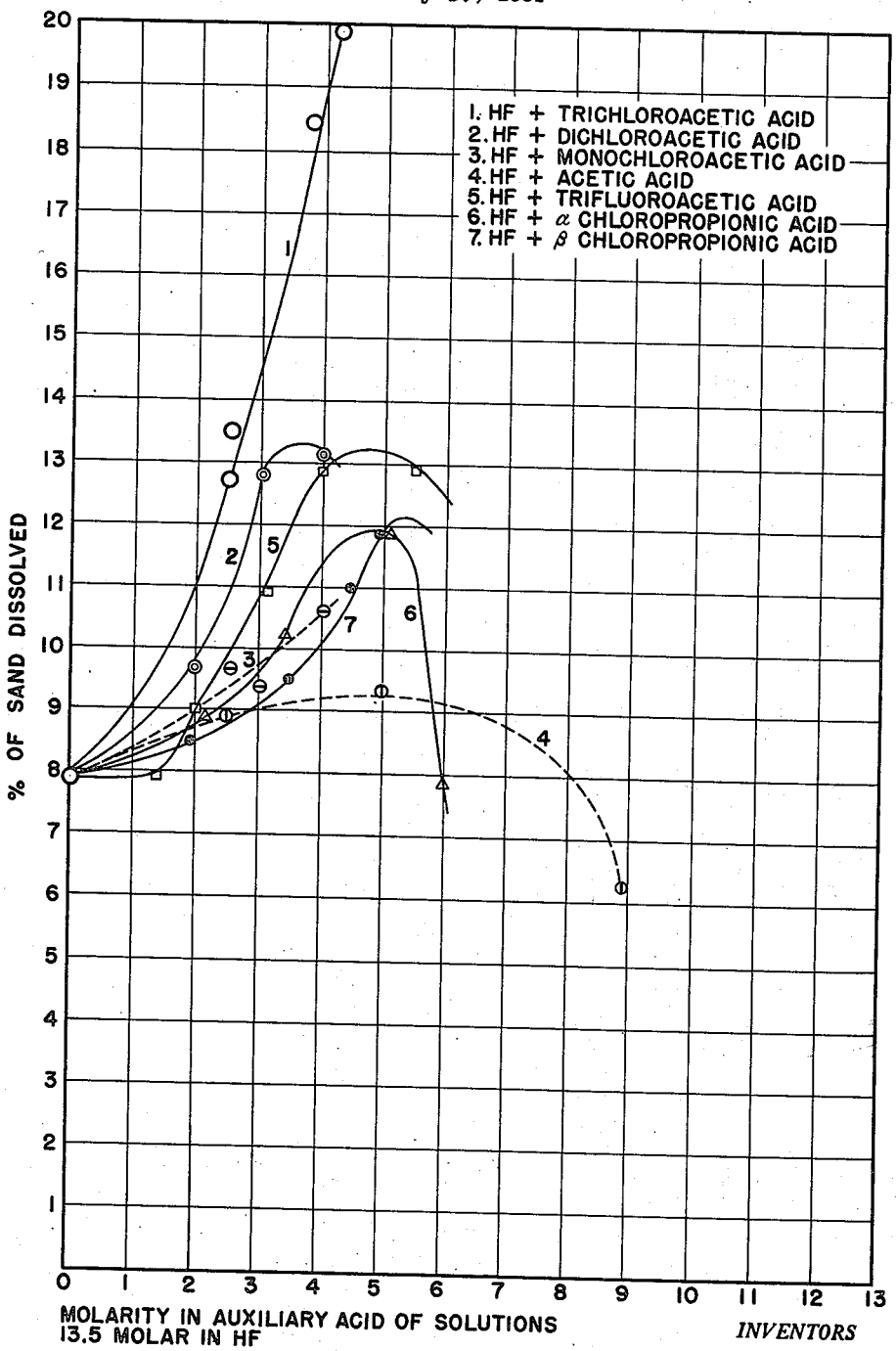

2,652,360

UNITED STATES PATENT OFFICE 2,652,360

ACIDIZING SILICEOUS EARTH FORMATIONS

Donald C. Bond, Crystal Lake, and Roy H. Lorenz, Elmhurst, Ill., assignors to The Pure Oil Company, Chicago, Ill., a corporation of Ohio Application May 10, 1951, Serial No. 225,492

26 Claims. (Cl. 252—8.55)

The present invention is directed to a method of acid treating earth formations, especially siliceous earth formations, for the purpose of increasing the permeability thereof and facilitating the flow of fluids therethrough.

A fundamental object of this invention is to provide a method for dissolving silica and silica-containing substances by treatment with a new acid composition containing hydrofluoric acid and a halogenated organic auxiliary acid.

A second object of this invention is to provide a method of acid-treating oil wells to increase the production of oil therefrom by treatment with an acid composition comprising hydrofluoric acid and a halogenated organic auxiliary acid.

A third object of this invention is to employ as an acid treating composition an aqueous solution of hydrogen fluoride and a halogenated acetic acid to increase the permeability of siliceous earth formations or to dissolve silica and silica-containing substances.

Further objects and advantages of this invention will become apparent as the description thereof proceeds. Throughout this specification the term hydrogen fluoride will be used to indicate anhydrous hydrogen fluoride and the term hydrofluoric acid to indicate an aqueous solution of hydrogen fluoride.

It is known that earth formations comprising massive calcite or dolomite as part or all of their composition may be dissolved or partially disintegrated by contact with various inorganic acid solutions. The treatment of silica and silicates in the form of quartz, or the vitreous, Chalcedonic, Jaspery varieties, and also the anhydrous silicates and bisilicates for the purpose of increasing their permeability by the use of inorganic acid solutions, especially those containing hydrofluoric acid has been proposed. It has also been proposed to control the resulting soluble silicates which are formed to prevent their subsequent precipitation or gelatinization with attendant plugging of the formation. It is known that the presence of small amounts of such agents as phosphoric acid or sodium acid pyrophosphate will prevent the gelatinization of these silicates. It is disclosed in J. J. Heigs' United States Patent 2,094,479 that sandstone formations may be attacked by using hydrofluoric acid mixed with such mineral acids as sulphuric, hydrochloric and nitric. It is also known that fluoboric acid alone or in combination with hydrofluoric acid or a mixture of boric acid and hydrofluoric acid, as disclosed by G. W. Ayers in United States Patent 2,300,393, will increase the fluid permeability of earth formations. Also, organic acids alone are generally not strong enough to effectively dissolve siliceous formations.

The present invention is based on the discovery that the ability of hydrofluoric acid to dissolve and increase the permeability of siliceous formations is greatly enhanced by the presence of a halogenated organic auxiliary acid. The effectiveness of the combination of acids of this invention to dissolve siliceous formations is synergistic, being considerably greater than the additive effect of the acid when used separately for this purpose at a given concentration. For a certain concentration of hydrofluoric acid which in itself is optimum for dissolving sandstone, increased concentrations of a halogenated organic auxiliary acid will augment the activity of the composition. Also for a certain concentration of a halogenated organic acid its ability to dissolve silica increases as the concentration of hydrofluoric acid therein increases. It has been found that solutions of hydrofluoric acid having a molarity of about 13.5, i. e., containing about 270.0 grams of hydrogen fluoride per liter, may be promoted in their ability to dissolve sandstone by the addition of from about 1 to 5 moles per liter of a halogenated organic acid. Successful treatments may be obtained by using a concentration of hydrogen fluoride between about 5 and 25 moles per liter along with from 2.5 to 4.2 moles per liter of a halogenated organic acid.

By a halogenated organic acid is meant that class of organic acids represented by the formula:

$C_yH_nX_m(COOH)_w$ where X may be a halogen as chlorine, fluorine, iodine and bromine, y is an integer from 0 to 10, n is an integer from 0 to 20, m is an integer from 1 to 20, and w is an integer from 1 to 3. Common acids of this general class which may be used in accordance with this invention are bromoacetic acid (CH₂BrCOOH), chloroacetic acid (CH₂ClCOOH), dichloroacetic acid (CHCl₂COOH)

difluoroacetic acid (CHF₂COOH), diiodoacetic acid (CHI₂COOH)

fluoroacetic acid (CH₂FCOOH), iodoacetic acid (CH₂ICOOH), tribromoacetic acid (CBr₃COOH), trifluoroacetic acid (CF₃COOH), trichloroacetic acid (CCl₃COOH) and triiodoacetic acid (CI₃COOH)

Such acids as

Chloromalonic acid
3-bromophthalic acid
4-chlorophthalic acid
α-Bromopropionic acid
β-Bromopropionic acid
α-Chloropropionic acid
β-Chloropropionic acid may also be used in accordance with this invention. In general, those halogenated organic acids which are at least slightly soluble in water and not reactable with the hydrofluoric acid are acceptable.

Of these halogenated organic acids the mono-, di-, and tri-chloroacetic acids are preferred because they are less expensive and easier to handle than the other organic halogen-containing acids. Trichloroacetic acid is especially active and applicable to the treatment of the types of siliceous formations found in earth bores and therefore may be used to demonstrate the invention. It is preferred that the halogenated organic acid as represented by trichloroacetic acid be used in an amount sufficient to substantially saturate the hydrofluoric acid solution. The combination of trichloroacetic acid and hydrofluoric acid has been found to exhibit an activity above that of other inorganic and organic acid combinations.

The present invention has application in the treatment of any silica-containing substance for the purpose of dissolving the same. It may be applied in the treatment of earth formations adjacent a well bore for the purpose of increasing the permeability thereof. Such treatment facilitates the injection of fluids therein for repressuring, flooding or cleaning the formation. A specific application is the acidization of siliceous formations to increase the production of oil therefrom. Another application comprises treating metal castings to remove sand particles therefrom. It is to be understood that where corrosion of metals may occur due to the acid compositions of this invention an inhibitor such as a compound of arsenic, as the arsenic and arsenous acids, arsenic chloride or a mercaptan should be used to protect the metal surfaces.

The present invention may be illustrated by the treatment of an oil or gas well which has ceased to flow or which is producing at a reduced rate. By introducing into the well bore a suitable quantity of an acid composition comprising at least about 5 moles of hydrogen fluoride per liter and at least about 2.5 moles of a halogenated acetic acid per liter, preferably trichloroacetic acid, the desired result can be accomplished. After the acid composition has remained in the formation for at least about 1 hour and preferably as long as 2 hours or more it is removed and flushed from the formation. The quantity of acid composition used will depend upon the size of the well bore and the porosity of the formation to be treated. The total quantity of acid composition used may range from 50 to 1000 barrels or more. With some earth formations which are plugged from extended pumping and producing operations it may be necessary to repeat the application of the acid composition to obtain the desired result. The acid composition may be mixed at the well head and introduced directly into the well or the hydrofluoric acid may be introduced first and the water and halogenated acetic acid thereafter injected. Conversely the halogenated acetic acid may be introduced first followed by the water and hydrogen fluoride. The efficiency of the process may be further enhanced by subsequently treating or flushing the formation with water or other inert liquid. This will remove any reaction products remaining after completion of the reaction and insure that they do not later precipitate and cause plugging.

In treating underground formations the acid compositions of this invention are used at temperatures at least about room temperature. Since the formation itself may be at a higher temperature, averaging around 150° F. the acid composition will absorb heat from the formation. This increases the activity of the acid composition and increases the solubility of the silicate reaction products in the resulting effluent. Some degree of care should be exercised to avoid allowing the effluent from each treatment to fall below the limit of solubility of the silicates therein since plugging may result. For this reason it is desirable to remove the acid composition after about 2 hours or before it has cooled more than 50 to 90° F. below the highest temperature reached in reacting with silica.

To demonstrate the invention various aqueous acid mixtures were prepared each having a molarity in hydrofluoric acid of 13.5 and containing various molarities of auxiliary acid. In the series of tests reported in Table I, following, 65 cc. of the acid mixture were agitated with 10 grams of 40 mesh sand for two hours at 80° F. in a polyethylene bottle. The polyethylene bottle was rotated about an axis inclined 16° to the horizontal continuously at 200 R. P. M. during the experiments and the amount of sand dissolved was calculated and considered as a measure of the rate of reaction of the acids on silica. The sand used was ordinary 40 mesh sandblasting sand containing 99.5% SiO₂ and 0.5% Fe₂O₃ and Al₂O₃. The temperature was controlled by means of a water bath to within 0.1° F. At the end of two hours the rotation was stopped, the bottle removed from the water bath and filled with cold water. The sand was allowed to settle and the water was decanted. After four washings with cold water the residual sand was transferred to a tared filter crucible, rinsed with acetone and the crucible placed in an oven for one hour at 210° F. Upon removal from the oven and cooling to room temperature, the crucible was weighed to obtain the amount of residual sand not dissolved by the acid. The results are as follows:

TABLE I

*Rate of solution of silica in various aqueous acid mixtures*

| Type of Auxiliary Acid Present | Molarity in Auxiliary Acid | Percent of Sand Dissolved |
|---|---|---|
| None | | 7.9 |
| Trichloroacetic | 2.5 | 13.5 |
| Do | 2.5 | 12.7 |
| Do | 3.8 | 18.5 |
| Do | 4.2 | 19.9 |
| Hydroiodic | 1.3 | 11.0 |
| Do | 2.5 | 13.3 |
| Do | 3.3 | 14.0 |
| Do | 3.7 | 15.5 |
| Do | 3.7 | 15.9 |
| Hydrobromic | 1.3 | 10.5 |
| Do | 2.5 | 12.6 |
| Do | 3.5 | 13.7 |
| Do | 4.5 | 10.9 |
| Hydrochloric | 2.5 | 11.9 |
| Do | 5.0 | 13.8 |
| Sulfuric | 2.5 | 13.1 |
| Do | 5.0 | 13.7 |
| Do | 7.5 | 8.5 |
| Do | 10.0 | 8.4 |
| Orthophosphoric | 1.7 | 10.1 |
| Do | 3.3 | 12.6 |
| Do | 5.0 | 13.6 |
| Do | 6.7 | 13.6 |
| Do | 8.3 | 11.8 |
| Do | 10.0 | 8.9 |
| Nitric Acid | 2.5 | 11.1 |
| Do | 5.0 | 12.4 |
| Do | 7.9 | 11.4 |
| Formic Acid | 2.5 | 9.3 |
| Do | 5.0 | 10.0 |
| Do | 7.5 | 9.6 |
| Acetic Acid | 2.5 | 8.9 |
| Do | 5.0 | 9.3 |
| Do | 8.9 | 6.3 |
| Boric Acid | 1.2 | 5.6 |
| Do | 2.5 | 3.0 |
| Do | 3.7 | 0.1 |
| Do | 5.0 | 0.1 |
| Arsenic Acid | 0.8 | 6.2 |
| Do | 1.7 | 2.4 |
| Do | 2.8 | 1.0 |
| Dichloroacetic | 2.0 | 9.7 |
| Do | 3.0 | 12.8 |
| Do | 4.0 | 13.1 |
| Monochloroacetic | 2.5 | 9.7 |
| Do | 3.0 | 9.4 |
| Do | 4.0 | 10.6 |
| Trifluoroacetic | 1.3 | 7.9 |
| Do | 2.0 | 9.1 |
| Do | 3.1 | 10.8 |
| Do | 4.0 | 12.7 |
| Do | 5.5 | 12.5 |
| Do | 7.1 | 9.2 |
| α-Chloropropionic | 2.1 | 9.0 |
| Do | 3.5 | 10.3 |
| Do | 5.0 | 11.8 |
| Do | 6.0 | 7.8 |
| β-Chloropropionic | 1.8 | 8.8 |
| Do | 3.5 | 9.6 |
| Do | 4.5 | 11.1 |
| Do | 5.0 | 11.9 |

From Table I it is apparent that a 13.5 molar hydrofluoric acid solution containing trichloroacetic acid is outstanding in its ability to promote the dissolution of sandstone. The combination of hydrofluoric acid and trichloroacetic acid increases in its ability to dissolve sandstone as the concentrations of the trichloroacetic acid increase up to the limit of solubility of trichloroacetic acid in the hydrofluoric acid solution. The effect of acetic acid is progressively increased as more chlorine atoms are substituted for the non-functional hydrogen atoms in the acetic acid molecule. The combination of hydrofluoric acid and hydroiodic acid is also good. In the case of the mixture of hydrofluoric and hydrochloric acids the addition of greater quantities hydrochloric acid increased the ability of the composition to dissolve sand but the solution did not reach the degree of efficiency of the chloroacetic acid. The presence of large amounts of sulfuric, orthophosphoric, nitric, formic, or acetic acids had an adverse effect on the ability of hydrofluoric acid to disintegrate sandstone. Boric acid or arsenic acid in any concentration had an adverse effect. Trifluoroacetic acid is about as effective an auxiliary acid as dichloroacetic acid. Both α and β chloropropionic acid are effective but not of the order of the dichloro-, trichloro, or trifluoroacetic acid.

In order to further demonstrate the effect of the auxiliary acids on the ability of hydrofluoric acid to disintegrate sandstone, a series of curves were plotted with per cent of sand dissolved as ordinates and molarity of auxiliary acids of solutions 13.5 molar in hydrogen fluoride as abscissae, using the data from Table I. These curves are shown in the graph. The base point A common to all seven curves represents the 7.9 per cent of sand dissolved by a 13.5 molar hydrofluoric acid solution. Curve 4 shows the slight effect of acetic acid, while curves 1, 2 and 3, representing trichloro-, dichloro- and monochloroacetic acid, respectively, show the effect of increasing the number of chlorine atoms substituted for the non-functional hydrogen atoms in the acetic acid molecule. Curves 5, 6 and 7 show that trifluoroacetic acid is about as effective as dichloroacetic acid, whereupon α and β chloropropionic acids do not share in this effectiveness.

To form a basis of comparison experiments were conducted using each of the auxiliary acids of Table I alone and their ability to dissolve sand under the same conditions determined. The results are as follows in Table II:

TABLE II

*Rate of solution of silica in various acid solutions*

[65 cc. of acid solution agitated with 10 g. 40 mesh sand for 2 hours at 80° F.]

| Type of Acid | Molarity | Percent of Sand Dissolved |
|---|---|---|
| Trichloroacetic | 3.7 | 0.10 |
| Hydroiodic | 2.5 | 0.06 |
| Hydrobromic | 3.5 | 0.15 |
| Hydrochloric | 5.0 | 0.18 |
| Sulfuric | 5.0 | 0.20 |
| Orthophosphoric | 8.7 | 0.32 |
| Nitric | 5 | 0.25 |
| Formic | 5 | 0.12 |
| Acetic | 5 | 0.13 |

It has thus been demonstrated that the acid compositions of this invention are superior in their ability to disintegrate sandstone and that the ability of the combination of hydrofluoric acid and halogenated organic acid especially the halogenated acetic acids is outstanding in this respect being over that which can be obtained with either acid alone.

From the results reported in Table I it is apparent that the degree of permeability attainable is within the control of the operator by merely adjusting the composition of the treating solution. Solutions used in accordance with this invention may be prepared by simply mixing anhydrous hydrogen fluoride and halogenated organic auxiliary acid with sufficient water to obtain the desired molarity. Water is the preferred carrier liquid for the acids since it promotes the acid activity through ionization.

By using a mixture of hydrofluoric acid and chlorinated fatty acid (trichloroacetic acid) the reactivity of a strong hydrofluoric acid solution toward silica can be obtained without the hazard of handling a strong hydrofluoric acid solution. Thus, the reactivity (toward silica) of a 13.5 m. hydrofluoric solution, also 4.2 m. in trichloroacetic acid, is about the same as that of a 19 m. hydrofluoric solution containing no added trichloroacetic acid. The 13.5 m. hydrofluoric solution is much less dangerous to handle than the 19 m. solution.

What is claimed is:

1. A composition for dissolving substantial portions of silica comprising hydrofluoric acid and a halogenated organic carboxylic acid, said halogenated organic carboxylic acid being present in an amount sufficient to enhance the reaction of said hydrofluoric acid with said silica.

2. A composition in accordance with claim 1 in which the halogenated organic carboxylic acid has up to 10 carbon atoms in the organic portion of the molecule.

3. A composition in accordance with claim 2 in which the halogenated organic carboxylic acid is a halogenated fatty acid.

4. A composition for dissolving substantial portions of silica comprising hydrofluoric acid and a halogenated acetic acid, said halogenated acetic acid being present in an amount sufficient to enhance the reaction of said hydrofluoric acid with said silica.

5. A composition in accordance with claim 4 in which the halogenated acetic acid is trichloroacetic acid.

6. A composition in accordance with claim 4 in which the halogenated acetic acid is tribromoacetic acid.

7. A composition in accordance with claim 4 in which the halogenated acetic acid is triiodoacetic acid.

8. A composition in accordance with claim 4 in which the halogenated acetic acid is trifluoroacetic acid.

9. A composition for dissolving substantial portions of silica comprising a solution containing at least about 5 moles of hydrogen fluoride per liter and at least about 2.5 moles of a halogenated organic carboxylic acid per liter.

10. A composition in accordance with claim 9 in which the halogenated organic carboxylic acid has up to 10 carbon atoms in the organic portion of the molecule.

11. A composition in accordance with claim 10 in which the halogenated organic acid is a halogenated fatty acid.

12. A composition in accordance with claim 9 in which the halogenated organic acid is a halogenated acetic acid.

13. A composition in acocrdance with claim 12 in which the halogenated acetic acid is trichloroacetic acid.

14. A composition in accordance with claim 12 in which the halogenated acetic acid is tribromoacetic acid.

15. A composition in accordance with claim 12 in which the halogenated acetic acid is triiodoacetic acid.

16. A composition in accordance with claim 12 in which the halogenated acetic acid is trifluoroacetic acid.

17. A composition for dissolving substantial portions of silica comprising an aqueous solution containing at least about 5 moles of hydrogen fluoride per liter and is saturated with a halogenated organic carboxylic acid having up to 10 carbon atoms in the organic portion of the molecule.

18. The method of increasing the permeability of siliceous formations by the injection of hydrofluoric acid and a halogenated organic carboxylic acid therein under conditions to promote the reaction of said acids with said formations.

19. The method in accordance with claim 18 in which the halogenated organic carboxylic acid has up to 10 carbon atoms in the organic portion of the molecule.

20. The method in accordance with claim 19 in which the halogenated organic carboxylic acid is a fatty acid.

21. The method in accordance with claim 19 in which the halogenated organic carboxylic acid is a halogenated acetic acid.

22. The method of increasing the permeability of siliceous formations by the injections therein of an aqueous solution containing at least about 5 moles of hydrogen fluoride per liter and at least about 2.5 moles of a halogenated organic carboxylic acid per liter.

23. The method of increasing the permeability of siliceous formations by the injection therein of an aqueous solution containing at least about 5 moles of hydrogen fluoride per liter and substantially saturated with a halogenated acetic acid.

24. A method in accordance with claim 23 in which the halogenated acetic acid is trichloroacetic acid.

25. The method of increasing the production rate of oil, water and gas wells by injecting therein a solution of hydrofluoric acid and a halogenated fatty acid, said solution being of sufficient concentration to react with the formations in said wells.

26. The method in accordance with claim 25 in which the halogenated fatty acid is trichloroacetic acid.

DONALD C. BOND.
ROY H. LORENZ.

References Cited in the file of this patent

UNITED STATES PATENTS

| Number | Name | Date |
| --- | --- | --- |
| 2,175,079 | Dow | Oct. 3, 1939 |
| 2,225,695 | Henderson et al. | Dec. 24, 1940 |
| 2,358,562 | Dismukes | Sept. 19, 1944 |
| 2,370,421 | Reed | Feb. 27, 1945 |